Sept. 30, 1969  S. RAYMOND ET AL  3,470,080
MULTI-PHASE ELECTROPHORETIC DISTRIBUTION
Filed June 27, 1966

INVENTORS
SAMUEL RAYMOND
JOHN BROOME
BY
ATTORNEYS

United States Patent Office 3,470,080
Patented Sept. 30, 1969

3,470,080
MULTI-PHASE ELECTROPHORETIC
DISTRIBUTION
Samuel Raymond and John Broome, both of
4312 Osage Ave., Philadelphia, Pa. 19104
Filed June 27, 1966, Ser. No. 560,550
Int. Cl. B01k 5/00
U.S. Cl. 204—180                                          3 Claims

ABSTRACT OF THE DISCLOSURE

A process and apparatus for multi-phase electrophoretic distribution utilizes both electrophoretic mobility and phase distribution as separation parameters. Mixing and non-mixing phases are placed in contact in separate receptacles and in an electrophoric field to cause electrophoretic migration in either direction, e.g., either into or out of the non-mixing zone within the receptacles. The contents of the mixing zones of the receptacles are transferred sequentially with respect to the non-mixing zones with a reversing of the electrophoretic field.

Figure 1A:
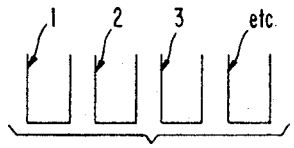

This invention relates to process and apparatus for separating mixtures of proteins and similar electrophoretically-active materials into their component parts.

The present art for separating such mixtures comprises two distinct arts, namely (1) separations based upon electrophoretic mobility as a parameter, and (2) separations based on phase distribution as the parameter.

Separations based on electrophoresis are well known, and include both analytical and preparative processes. These may be either continuous flow or batch-type operations, but in either type, characteristically, the mixture is subjected to a fixed electrophoretic field until separation is achieved to the degree possible by electrophoretic mobility, and then the electrophoretic pattern is analyzed or the separated components are recovered according to the objects of the art employed. The known electrophoresis art needs improvement in many respects, such as resolving power, dilution, sensitivity, and mass capacity. In particular, it is difficult to separate and resolve mixtures of substances of small and zero mobility.

Separations based on phase distribution include as examples precipitation, gel filtration, chromatography, and solubility distribution. This last is exemplified by countercurrent distribution, which can be applied to molecules as large as proteins and even whole cells by the use of 2-phase aqueous systems. In spite of their many known advantages these techniques have not been widely applied to the separation of proteins and similar large molecules because they depend on phase systems and chemical interactions which are specific for each individual system and have to be intensively studied and worked up so as to permit optimum application each time a new mixture is subjected to the technique. Thus the phase distribution art also needs much improvement.

In spite of the obvious need for improvement in both electrophoresis and phase distribution arts, no one until the present invention has attempted, has been able, or has known how to combine the two arts in such a way as to improve and increase their usefulness.

We have discovered how to combine both electrophoresis art and phase distribution art for the separation of protein mixtures. When applied as we shall specify in combination the advantages of each separating technique are increased in unobvious ways and in fact are magnified many-fold. We have found ways of applying both techniques together and have discovered the principles of application and apparatus for the combined technique.

The objects of our invention accordingly are to provide process and apparatus which can separate mixtures of proteins and similar electrophoretically active components, to increase the resolution, mass capacity and sensitivity, to permit the separation and recovery of components of very low or even zero mobility and to provide technique, process and apparatus which are generally applicable.

Other objects and advantages of our invention will become apparent from the present specification and drawings which explain and illustrate the principle of this invention and preferred modes of practicing it.

Figure 1B:
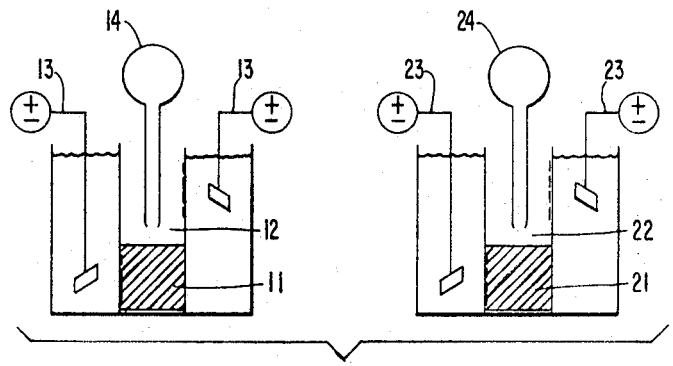
Figure 2:
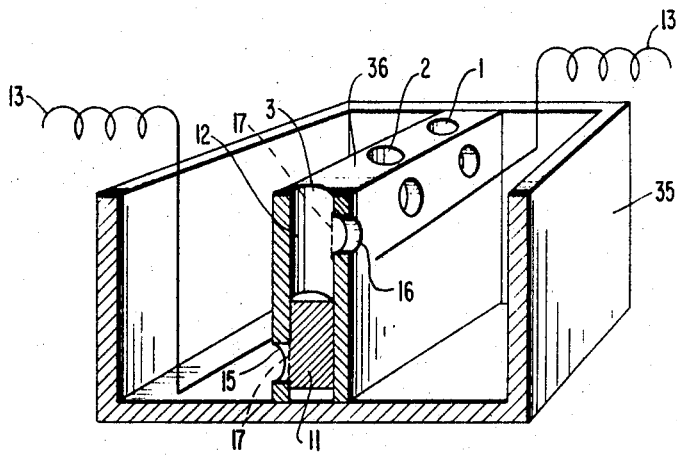

In the drawings:

FIGS. 1a and 1b are schematic drawings of the apparatus of our invention. FIG. 2 is a perspective view in transverse section of a preferred embodiment of an apparatus for practicing our invention.

In accordance with our invention, as shown generally in FIG. 1a, a series of tubes 1, 2, 3, etc. are provided. Each tube such as shown in FIG. 1b is adapted to contain a non-mixing zone 11 and a mixing zone 12. Means 13 are provided for establishing an electrophoretic field within each tube in such a way that electrophoretic migration can be effected either in a forward direction from mixing zone to non-mixing zone or in a reverse direction from non-mixing zone to mixing zone. Further means 14 are provided for transferring the contents of each mixing zone sequentially with respect to the non-mixing zones.

FIGURE 2 shows a preferred form of apparatus partly in cross section, comprising an outer tank 35 which holds a buffer solution and a central block 36 which holds a series of tubes 1, 2, 3. Each tube has two ports, e.g. a lower 15 and an upper 16 communicating with opposite sides of block 36. The ports may be closed off my means of semi-permeable membranes 17, 17. Within each tube at the lower end thereof is formed a non-mixing zone 11, by filling up the lower portion of the tube with a porous or permeable solid or gel. We prefer to use a polyacrylamide gel of about 5% concentration. Above the non-mixing zone there is a mixing zone 12 filled with an electrophoresis buffer. The mixing zone extends at least up to the level of the upper port 16. On opposite sides of block 36, within outer tank 35 there are two electrodes 13. The tank is filled with electrophoresis buffer to a level at least up to upper port 16.

Reverting now to the process of our invention, we insert a solution containing a mixture of electrophoretically active components in a selected volume of appropriate buffer solution into the mixing zone 12 of tube 1. Electrophoretic field is applied by electrode means 13 in a forward direction to effect migration of a portion of components into non-mixing zone 11, leaving a residual portion of components in mixing zone 12. The solution, containing residual portion, is then transferred by transfer means 14, which may be a bulb, syringe, decanting mechanism, pump or other suitable transferring means, to a mixing zone 22 of the next sequential tube 2 in the series. The mixing zone thereby emptied is filled with an equal volume of fresh buffer, if said zone is first in the series, or with the solution from the preceding mixing zone, if not the first. Electrophoretic field is next applied by means 13, 23 in a reverse direction to each of tubes 1, 2, to effect reverse migration of components within non-mixing zones 11, 21 into mixing zones 12, 22 respectively. The reverse migration is continued until substantially all of electrophoretically active components within zone 11, 21 have migrated into the corresponding mixing zones 21, 22. Each mixing zone is separately mixed to effect substantially uniform concentration of each component throughout each such mixing zone, although, as will be seen, both concentration and composition will in general be substantially different from one to any other mixing zone. This completes one cycle of the process.

Now electrophoretic field is applied in a forward direction as before to again effect migration into the non-mixing zones and so forth. The entire cycle is repeated as many times as is necessary to obtain the desired degree of separation.

It will be observed that at each repetition of the process the number of tubes in use increases by one and the number of individual portions of buffer added to the entire system increases by one. If the process is repeated until all the tubes provided in the apparatus are in use, the process may then be continued in either of two ways: (1) the contents of mixing zone from the last tube in the series is withdrawn from the apparatus entirely during the transfer stage of the process, each preceding mixing zone contents is transferred as above, and a fresh volume of buffer is added to the first mixing zone, whereby a limited number of tubes in the apparatus may serve for an unlimited number of repetitions of the cycle; or (2) the contents of the mixing zone from the last tube is transferred to the previously emptied mixing zone of the first tube, and each preceding mixing zone is transferred to its following mixing zone in the series as above, whereby a limited number of mixing volumes may be repeatedly reprocessed as many times as are required.

In carrying through the transfer we may provide auxiliary reservoirs to serve as temporary storage for mixing tube contents during transfer.

The process of our invention may also be carried out by the equivalent process in which the sample to be separated is first placed into a non-mixing zone, reverse migration is applied until at least a portion of the sample has migrated into the corresponding mixing zone, transfer is effected, and further reverse migration is effected until substantially all of the sample has migrated out of the mixing zone, followed by continuance of the cycle as described above.

Accordingly, the essence of our invention comprises the removal of proteins from a mixing zone by electrophoresis, transferring the mixing zone buffer, and returning the removed proteins to a fresh mixing zone buffer by reverse electrophoresis. The employment of forward and reverse electrophoretic movement alternately repeated is a unique feature of our invention, which distinguishes it from prior electrophoresis art.

A second unique feature of our invention distinguishing it from prior art is that the components travel through the entire process in the reverse order to their electrophoretic mobilities, so that the slowest-moving components electrophoretically move through the sequence of tubes at the fastest rate.

Thus in accordance with the present invention as disclosed herein, a new and useful process and apparatus are provided for the electrophoretic separation of a mixture of electrophoretically active components.

We claim:

1. A process for electrophoretic separation of a mixture of substances, comprising:
   (a) providing a series of non-mixing phases and a series of corresponding mixing phases in contact therewith respectively in a series of vessels, the non-mixing phase in at least one but not all of the vessels containing the mixture of substances to be separated,
   (b) passing electrophoretic current through said phases in a first direction to cause migration of electrophoretically active components from non-mixing to mixing phases,
   (c) mixing each said mixing phase separately from the others,
   (d) passing electrophoretic current through said phases to cause reverse migration of electrophoretically active components from mixing to non-mixing phases,
   (e) transferring mixing phases with respect to non-mixing phases to an adjacent vessel in the series of vessels, and
   (f) repeating steps (b) to (e) inclusive.

2. A process for electrophoretic separation of a mixture of substances, comprising:
   (a) providing a series of non-mixing phases and a series of corresponding mixing phases in contact therewith respectively in a series of vessels, the mixing phase in at least one but not all of the vessels containing the mixture of substances to be separated,
   (b) passing electrophoretic current through said phases in a first direction to cause migration of electrophoretically active components from the mixing phase to the non-mixing phase,
   (c) transferring each said mixing phase of each vessel separately from the others to an adjacent vessel in the series of vessels.
   (d) passing electrophoretic current through said phases in a second direction to cause reverse migration of electrophoretically active components in a direction opposite to the migration of step (b) from the non-mixing phase to the mixing phase,
   (e) mixing each said mixing phase, and
   (f) repeating steps (b) through (e) inclusive.

3. A process for electrophoretic separation of mixtures of substances, comprising:
   (a) providing a series of non-mixing phases and a series of corresponding mixing phases in contact therewith respectively in a series of vessels, the mixing phase containing the mixtures of substances to be separated,
   (b) passing electrophoretic current through said phases in a first direction to cause migration of electrophoretically active components from the mixing phase to the non-mixing phase,
   (c) transferring each said mixing phase of each vessel separately from the others to an adjacent vessel in the series of vessels,
   (d) passing electrophoretic current through said phases in a second direction to cause reverse migration of electrophoretically active components in a direction opposite to the migration of step (b) from the non-mixing phase to the mixing phase,
   (e) mixing each said mixing phase, and
   (f) repeating steps (b) through (e) inclusive.

References Cited

UNITED STATES PATENTS

| | | | |
|---|---|---|---|
| 2,566,308 | 9/1951 | Brewer | 204—180 |
| 2,989,457 | 6/1961 | Van Oss et al. | 204—299 |
| 3,129,158 | 4/1964 | Raymond et al. | 204—180 |
| 3,374,166 | 3/1968 | Raymond | 204—299 |
| 3,378,481 | 4/1968 | Saravis et al. | 204—299 |

JOHN H. MACK, Primary Examiner

A. C. PRESCOTT, Assistant Examiner

U.S. Cl. X.R.

204—299